(12) United States Patent
Mohan et al.

(10) Patent No.: US 12,229,591 B2
(45) Date of Patent: Feb. 18, 2025

(54) SYSTEM AND METHOD OF SCHEDULING PROCESSES FOR EXECUTION ON A RESOURCE

(71) Applicant: Visa International Service Association, San Francisco, CA (US)

(72) Inventors: Shivam Mohan, Lucknow (IN); Sudharshan Krishnakumar Gaddam, Hallehalli (IN); Shivani Gupta, Doddanekundi (IN)

(73) Assignee: Visa International Service Association, San Francisco, CA (US)

( * ) Notice: Subject to any disclaimer, the term of this patent is extended or adjusted under 35 U.S.C. 154(b) by 568 days.

(21) Appl. No.: 17/467,856

(22) Filed: Sep. 7, 2021

(65) Prior Publication Data
US 2023/0070949 A1   Mar. 9, 2023

(51) Int. Cl.
*G06F 9/48* (2006.01)
(52) U.S. Cl.
CPC .................................. *G06F 9/4881* (2013.01)
(58) Field of Classification Search
CPC .................................................... G06F 9/4881
See application file for complete search history.

(56) References Cited

U.S. PATENT DOCUMENTS

| | | | |
|---|---|---|---|
| 5,481,720 A * | 1/1996 | Loucks | G06F 21/31 |
| | | | 719/310 |
| 9,176,794 B2 | 11/2015 | Cheng et al. | |
| 9,501,407 B1 * | 11/2016 | Hu | G06F 12/0607 |
| 2008/0059966 A1 * | 3/2008 | Du | G06F 9/3838 |
| | | | 712/E9.046 |
| 2009/0119388 A1 * | 5/2009 | Kikuchi | H04L 67/5682 |
| | | | 709/219 |
| 2020/0167191 A1 | 5/2020 | Yeh et al. | |

* cited by examiner

*Primary Examiner* — Charlie Sun
(74) *Attorney, Agent, or Firm* — Buckley Patent Law LLC; Timothy Emmanuel Buckley

(57) ABSTRACT

A system includes a processor and a non-transitory computer readable medium coupled to the processor. The non-transitory computer readable medium includes code that requests, via a process, access to the processor using an access request, determines, at the process, a resource-grant status of the access request, and positions the process into an optimum execution schedule based upon a grant-status assessment of the resource-grant status. When a result of the grant-status assessment is that the access request is granted, the process performs an entropic assessment of entropic information associated with the resource-grant status of the process. When the access request entropy of the entropic information is below an optimum entropy access request threshold, an access request time associated with the access request entropy is designated as an optimum request time.

16 Claims, 14 Drawing Sheets

FIG. 3H

| ACCESS REQUEST ITERATION 363 | PROCESSES 320 | ACCESS REQUEST TIMES 356 | RESOURCE GRANT STATUS 353 | ACCESS GRANTED COUNTER 359 | OPTIMUM ACCESS REQUEST TIMES 360 | OPTIMUM ACCESS REQUEST SCHEDULE 390 |
|---|---|---|---|---|---|---|
| 363-1-1 | 320-1 | T+0 | 1 | 1 | . | . |
| 363-2-1 | 320-2 | T+0 | 0 | 0 | . | . |
| 363-3-1 | 320-3 | T+0 | 0 | 0 | . | . |
| 363-1-2 | 320-1 | T+0 | 1 | 2 | T+0 | T+0 |
| 363-2-2 | 320-2 | T+1 | 0 | 0 | . | . |
| 363-3-2 | 320-3 | T+1 | 0 | 0 | . | . |
| 363-1-3 | 320-1 | T+0 | 1 | 3 | . | T+0 |
| 363-2-3 | 320-2 | T+2 | 0 | 0 | . | . |
| 363-3-3 | 320-3 | T+2 | 0 | 0 | . | . |
| 363-1-4 | 320-1 | T+0 | 1 | 4 | . | T+0 |
| 363-2-4 | 320-2 | T+3 | 0 | 0 | . | . |
| 363-3-4 | 320-3 | T+3 | 1 | 1 | . | . |
| 363-1-5 | 320-1 | T+0 | 1 | 5 | . | T+0 |
| 363-2-5 | 320-2 | T+4 | 1 | 1 | . | . |
| 363-3-5 | 320-3 | T+3 | 0 | 1 | . | . |
| 363-4-1 | 320-4 | T+2 | 0 | 0 | . | . |
| 363-1-6 | 320-1 | T+0 | 1 | 6 | . | T+0 |
| 363-2-6 | 320-2 | T+4 | 1 | 2 | . | . |
| 363-3-6 | 320-3 | T+4 | 0 | 1 | . | . |
| 363-4-2 | 320-4 | T+3 | 0 | 0 | . | . |
| 363-1-7 | 320-1 | T+0 | 1 | 7 | . | T+0 |
| 363-2-7 | 320-2 | T+4 | 1 | 3 | T+4 | T+4 |
| 363-3-7 | 320-3 | T+5 | 0 | 1 | . | . |
| 363-4-3 | 320-4 | T+4 | 1 | 1 | . | . |
| 363-1-8 | 320-1 | T+0 | 1 | 8 | . | T+0 |
| 363-2-8 | 320-2 | T+4 | 1 | 4 | . | T+4 |
| 363-3-8 | 320-3 | T+6 | 0 | 1 | . | . |
| 363-4-4 | 320-4 | T+4 | 0 | 0 | . | . |
| 363-1-9 | 320-1 | T+0 | 1 | 9 | . | T+0 |
| 363-2-9 | 320-2 | T+4 | 1 | 5 | . | T+4 |
| 363-3-9 | 320-3 | T+7 | 0 | 1 | . | . |
| 363-4-5 | 320-4 | T+5 | 1 | 2 | . | . |
| 363-1-10 | 320-1 | T+0 | 1 | 10 | . | T+0 |
| 363-2-10 | 320-2 | T+4 | 1 | 6 | . | T+4 |
| 363-3-10 | 320-3 | T+8 | 1 | 2 | . | . |
| 363-4-6 | 320-4 | T+5 | 0 | 2 | . | . |
| 363-1-11 | 320-1 | T+0 | 1 | 11 | . | T+0 |
| 363-2-11 | 320-2 | T+4 | 1 | 7 | . | T+4 |
| 363-3-11 | 320-3 | T+8 | 1 | 3 | . | . |
| 363-4-7 | 320-4 | T+6 | 0 | 2 | . | . |
| 363-1-12 | 320-1 | T+0 | 1 | 12 | . | T+0 |
| 363-2-12 | 320-2 | T+4 | 1 | 8 | . | T+4 |
| 363-3-12 | 320-3 | T+8 | 1 | 3 | T+8 | T+8 |
| 363-4-8 | 320-4 | T+7 | 0 | 2 | . | . |
| 363-1-13 | 320-1 | T+0 | 1 | 13 | . | T+0 |
| 363-2-13 | 320-2 | T+4 | 1 | 9 | . | T+4 |
| 363-3-13 | 320-3 | T+8 | 1 | 4 | . | T+8 |
| 363-4-9 | 320-4 | T+8 | 0 | 2 | . | . |
| 363-1-14 | 320-1 | T+0 | 1 | 14 | . | T+0 |
| 363-2-14 | 320-2 | T+4 | 1 | 10 | . | T+4 |
| 363-3-14 | 320-3 | T+8 | 1 | 5 | . | T+8 |
| 363-4-10 | 320-4 | T+9 | 1 | 3 | . | . |
| 363-1-15 | 320-1 | T+0 | 1 | 15 | . | T+0 |
| 363-2-15 | 320-2 | T+4 | 1 | 11 | . | T+4 |
| 363-3-15 | 320-3 | T+8 | 1 | 6 | . | T+8 |
| 363-4-11 | 320-4 | T+9 | 1 | 2 | T+9 | T+9 |

397

SYSTEM AND METHOD OF SCHEDULING PROCESSES FOR EXECUTION ON A RESOURCE

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Operating systems are generally built to enable process scheduling with the assistance of a scheduler dispatch. The purpose of the scheduler dispatch is to ensure appropriate utilization of system resources and fair usage among competing processes. However, the scheduling decisions made by the scheduler dispatch as to which processes execute on independent cores of the computer system generally require the scheduler dispatch to focus on multiple processes at once and thus the scheduler dispatch is prone to exhibiting scheduling latency. In addition, the scheduler dispatch is not privy to all the information that the processes can incorporate into making scheduling decisions. Thus, there is a need for scheduling topologies that provide efficient scheduling and utilization of computer resources.

BRIEF DESCRIPTION OF THE DRAWINGS

FIG. 3H illustrates an access request iteration table that exemplifies a generation of optimum access request times and an optimum access request schedule using the process-based scheduling system of FIG. 3A-FIG. 3G in accordance with some embodiments.

DETAILED DESCRIPTION

Figure 1:
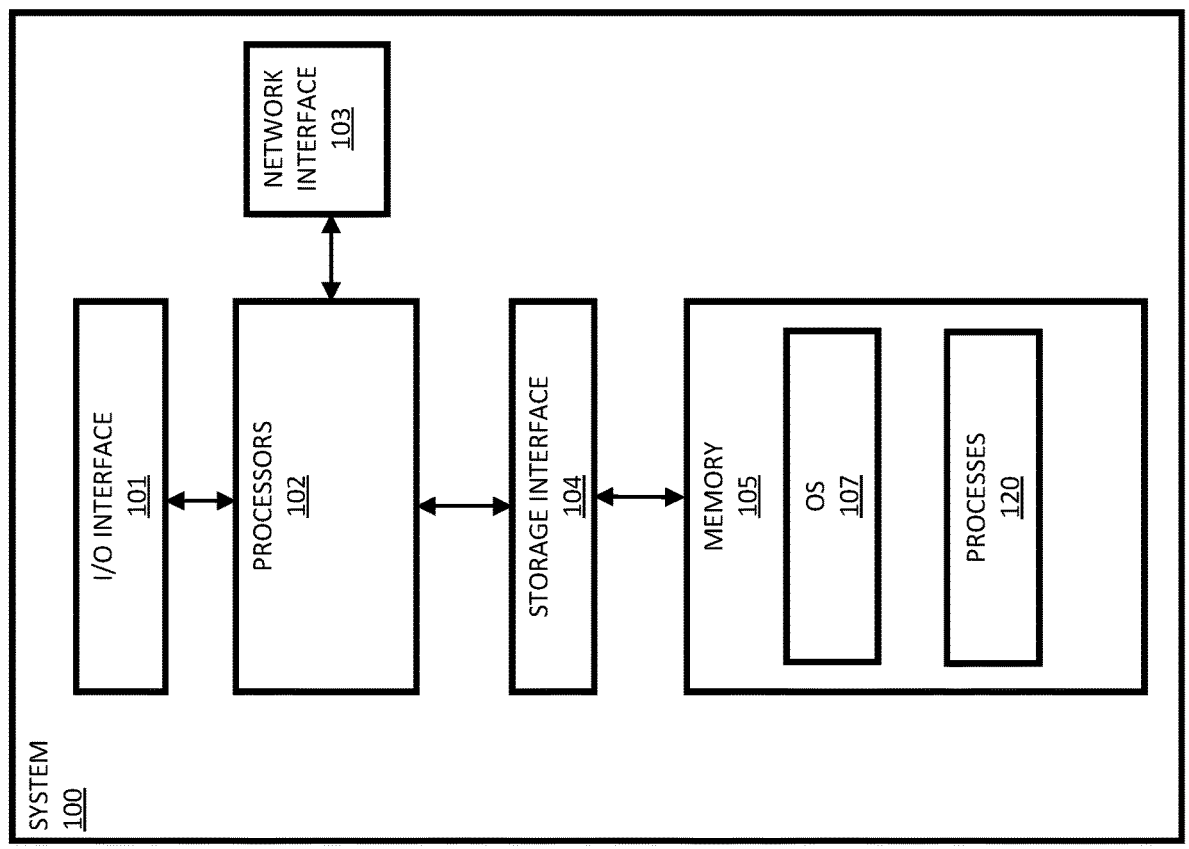
FIG. 1 is a block diagram of a processing system implementing process-based scheduling in accordance with some embodiments.

FIG. 1 illustrates a block diagram of an exemplary system 100 for implementing embodiments consistent with the present disclosure. In some nonlimiting embodiments or aspects, the system 100 may utilize a process-based scheduling system (described in further detail with reference to FIG. 2A-FIG. 2G) to implement a method for generating optimum access requests and an optimum access request schedule for processes requesting access to a resource, such as, a central processing unit ("CPU" or "processor") 102 or a plurality of processors 102. In some embodiments, the processor 102 may comprise at least one data processor for executing program components for dynamic resource allocation at run time. The processor 102 may include specialized processing units such as integrated system (bus) controllers, memory management control units, floating point units, graphics processing units, digital signal processing units, etc.

In some embodiments, the processors 102 may be disposed in communication with one or more input/output (I/O) devices (not shown) via an I/O interface 101. The I/O interface 101 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMi), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

In some embodiments, using the I/O interface 101, the system 100 may communicate with one or more I/O devices. For example, an input device 110 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device 111 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processors 102 may be disposed in communication with the communication network 109 via a network interface 103. The network interface 103 may communicate with the communication network 109. The network interface 103 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 109 may include, without limitation, a direct interconnection, e-commerce network, a peer to peer (P2P) network, local area network (LAN), wide area network (WAN), wireless network (e.g., using Wireless Application Protocol), the internet, Wi-Fi®, etc. Using the network interface 103) and the communication network 109, the system 100 may communicate with the one or more service operators.

In some non-limiting embodiments or aspects, the processors 102 may be disposed in communication with a memory 105 (e.g., RAM, ROM, etc. not shown in FIG. 1 via a storage interface 104. In some embodiments, the storage interface 104 may connect to memory 105 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

In some embodiments, the memory 105 may store a collection of program or database components, including, without limitation, a user interface 106, an operating system 107, a web server 108, etc. In some non-limiting embodiments or aspects, the system 100 may store user/application data, such as the data, variables, records, etc. as described in this disclosure. Such databases may be implemented as fault-tolerant, relational, scalable, secure databases such as Oracle or Sybase.

In some embodiments, the operating system 107 may facilitate resource management and operation of the system 100. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETB SD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® OS®, GOOGLE™ ANDROID™, BLACKBERRY® OS, or the like.

In some non-limiting embodiments or aspects, the system 100 may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc.

Furthermore, one or more computer-readable storage media may be utilized in implementing embodiments consistent with the present disclosure. In some embodiments, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Figure 2A:
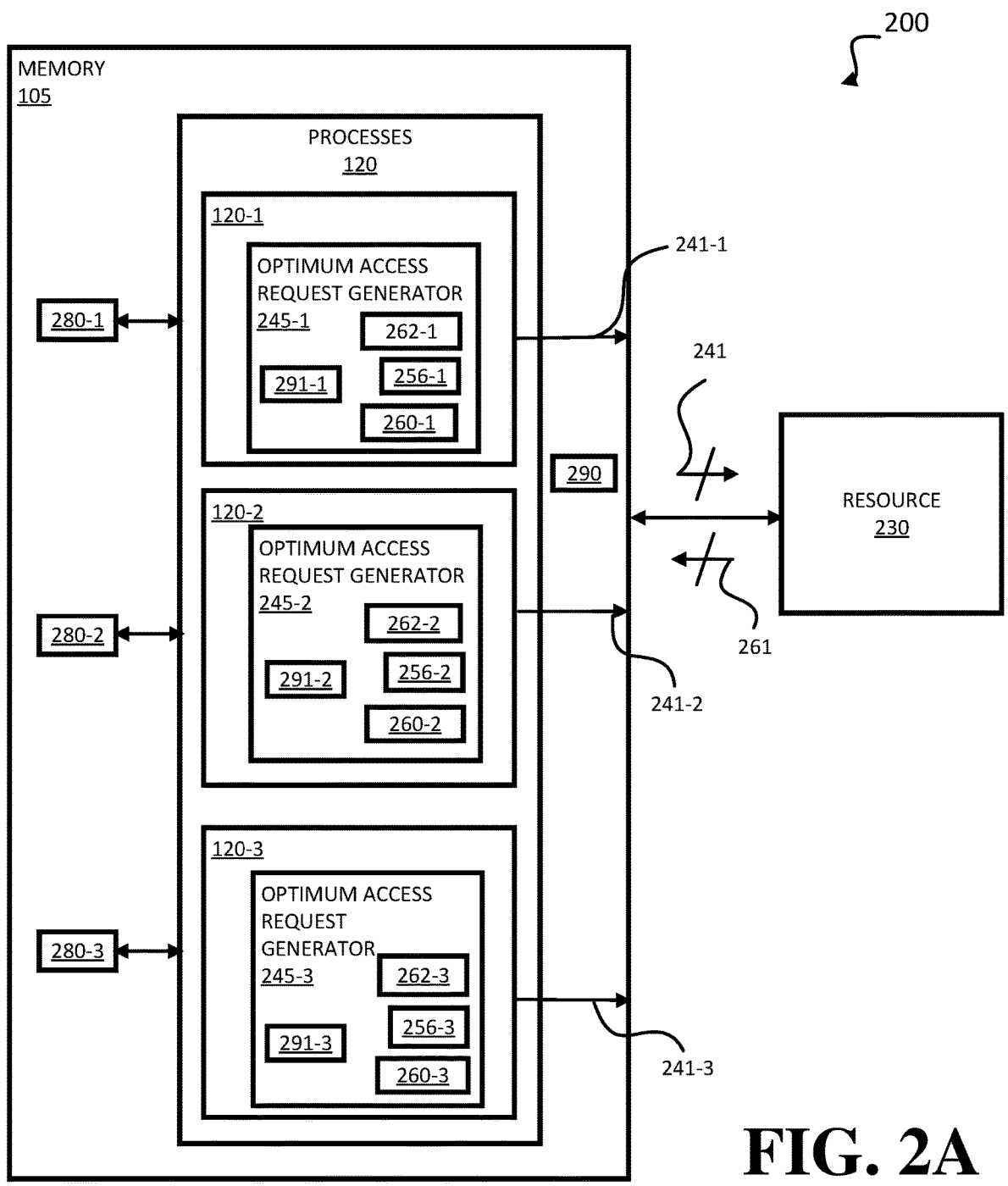
FIG. 2A is a block diagram of a process-based scheduling system that implements the process-based scheduling of FIG. 1 in accordance with some embodiments.
Figure 2B:
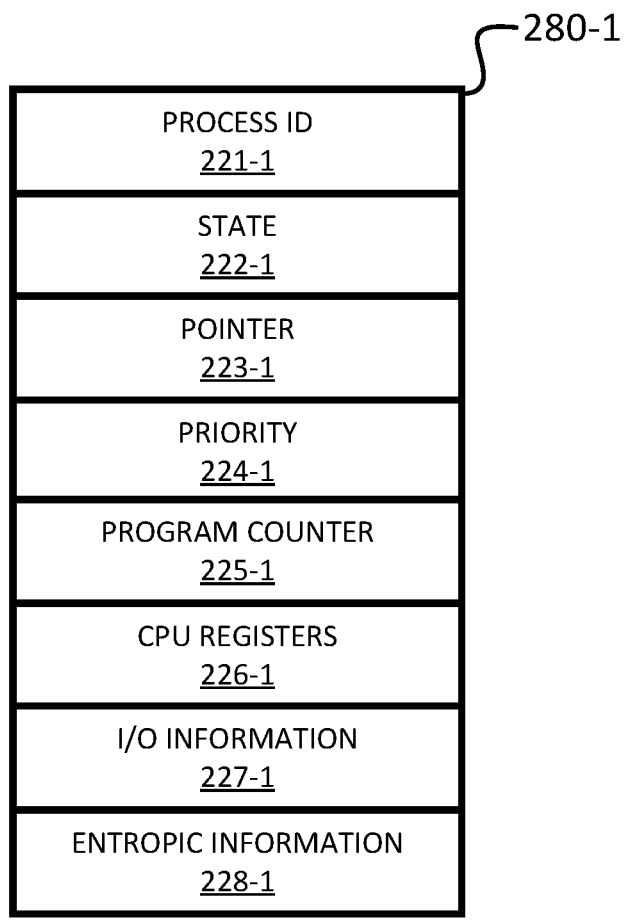
FIG. 2B-FIG. 2D illustrate process control blocks used in implementing the process-based scheduling of FIG. 1 in accordance with some embodiments.
Figure 2C:
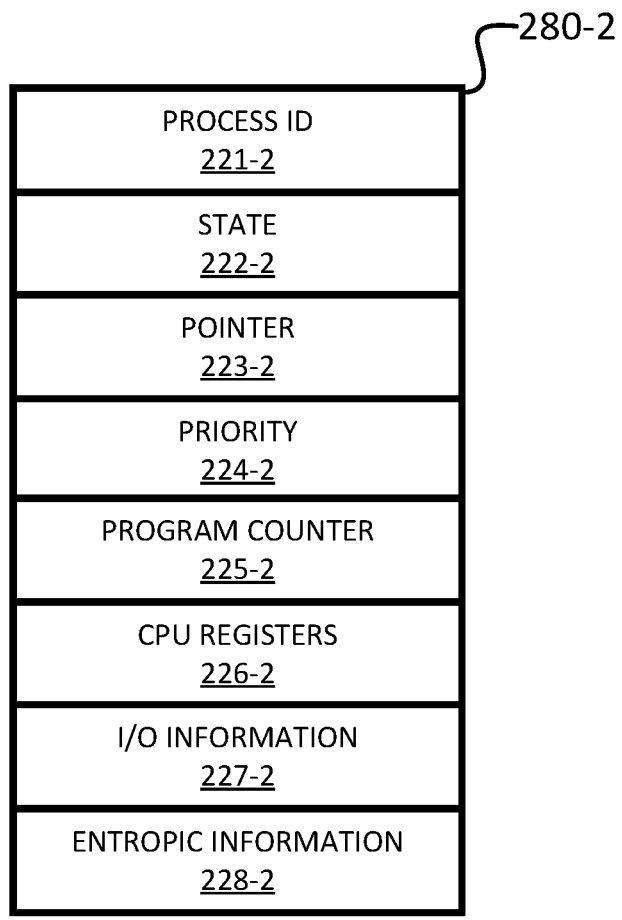
Figure 2D:
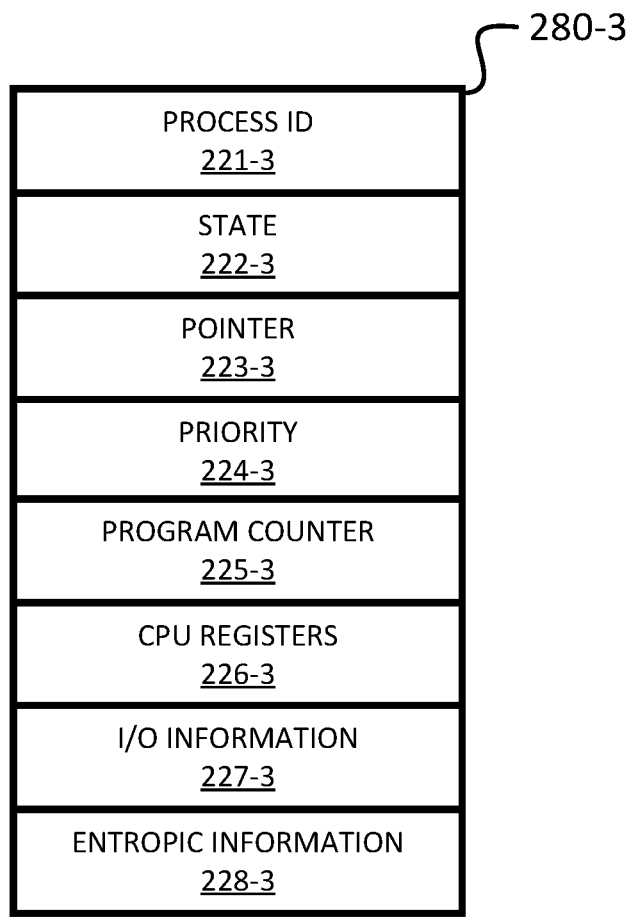
Figure 2E:
FIG. 2E-FIG. 2G illustrate entropic information of process control blocks FIG. 2B-FIG. 2D that are utilized in the process-based scheduling of FIG. 1 in accordance with some embodiments.
Figure 2F:
Figure 2G:

FIG. 2A illustrates a block diagram of a process-based scheduling system 200 that generates optimum access requests 291 and optimum access request schedule 290 in accordance with some embodiments. FIG. 2B—FIG. 2D illustrate process control blocks 280 utilized in the process-based scheduling system 200 of FIG. 2A in accordance with some embodiments. FIG. 2E-FIG. 2G illustrate entropic information 228 of process control blocks 280 of FIG. 2B—FIG. 2D that are utilized in the process-based scheduling system 200 of FIG. 2A in accordance with some embodiments. In some embodiments, processes 120 of process-based scheduling system 200 of FIG. 2A utilize a plurality of process control blocks 280 of FIG. 2B-FIG. 2D and the entropic information 228 of FIG. 2E-FIG. 2G to generate optimum access requests 291 and optimum access request process positions 231 for an optimum access request schedule 290.

In some embodiments, the process-based scheduling system 200 includes a process 120-1, a process 120-2, a process 120-3, a process control block 280-1, a process control block 280-2, and a process control block 280-3. In some embodiments, process 120-1 includes an optimum access request generator 245-1, process 120-2 includes an optimum access request generator 245-2, and process 120-2 includes an optimum access request generator 245-3. In some embodiments, processes 120 are instances of a computer program being executed in memory 105 that are configured to utilize optimum access request generators 245 to generate optimum access request times 260, optimum access requests 291, and optimum access request schedule 290. For example, process 120-1, process 120-2, and process 120-3 may be instances of application software that include an optimum access request generator 245-1, an optimum access request generator 245-2, an optimum access request generator 245-3, respectively. In some embodiments, the optimum access request generators 245 are configured to generate optimum access request times 260, optimum access requests 291, and optimum access request schedule 290 (described further in detail below). In some embodiments, operating system 107 may be embed a process or multiple processes 120 with the optimum access request generators 245 to generate optimum access request times 260, optimum access requests 291, and optimum access request schedule 290. In some embodiments, operating system 107 may be embed a process or multiple processes 120 with the optimum access request generators 245 to generate optimum access request times 260, optimum access requests 291, and optimum access request schedule 290 such that operating system 107 does not have to utilize a scheduler dispatch to schedule processes 120. In some embodiments, operating system 107 may be embed the process or multiple processes 120 with the optimum access request generators 245 that allow the processes 120 to work in tandem with other processes 120 to generate the optimum access request schedule 290. In some embodiments, the optimum access request schedule 290 may be considered an optimum execution schedule because, for example, the processes 120 are executed according to the timing of the optimum access requests 291 generated by optimum access request generators 245. In some embodiments, the processes 120 may include main executables and other additional executables that are configured to generate the optimum access requests 291. In some embodiments, the main executable may be an executable that controls the flow of the process and may call libraries or other executables to perform functions, such as, for example, the functions requested by the optimum access request generators 245 to generate the optimum access requests 291.

In some embodiments, optimum access request generator 245-1 is configured to utilize process control block 280-1 to generate an optimum access request time 260-1 and an optimum access request 291-1. In some embodiments, optimum access request generator 245-2 is configured to utilize process control block 280-2 to generate optimum access request time 260-2 and an optimum access request 291-2. In some embodiments, optimum access request generator 245-3 is configured to utilize process control block 280-3 to generate an optimum access request time 260-3 and an optimum access request 291-3. In some embodiments, the number of processes 120 and optimum access request generators 245 may vary depending on, for example, the number of processes 120 being executed by system 100. In some embodiments, memory 105 includes processes 120 and is coupled to a resource 230 to allow processes 120 to communicate with resource 230. In some embodiments, the resource 230, may be, for example, a processor or processing unit such as, a CPU, GPU, APU, or the like.

In some embodiments, process control block 280-1, process control block 280-2, and process control block 280-3 are data structures stored in memory 105 that, in addition to storing standard process control block information, are configured to store entropic information 228 that is configured to be used by optimum access request generator 245-1, optimum access request generator 245-2, and optimum access request generator 245-3 to generate optimum access request 291-1, optimum access request 291-2, and optimum access request 291-3. In some embodiments, the optimum access request 291-1, optimum access request 291-2, and optimum access request 291-3 are used to optimize the scheduling of each process 120-1, process 120-2, and process 120-3.

In some embodiments, with reference to FIG. 2B-FIG. 2D, each process control block 280 includes a process identification (ID) field, a state field, a pointer field, a priority field, program counter field, a CPU register field, an input/output (I/O) information field, and an entropic information field. In some embodiments, the process identification (ID) fields store a process IDs 221 that are unique identifiers used by operating system 107 to identify processes 120 and allow operating system 107 and processes 120 to ascertain which process of processes 120 is using resource 230 or other I/O devices or memory. In some embodiments, the state fields store states 222 that indicate a status of a process of processes 120 that allow operating system and processes 120 to ascertain when the processes 120 are "ready", "waiting", "suspended", etc. In some embodiments, the pointer fields store pointers 223 that point to a parent of a process (if any) of the processes 120. In some embodiments, the priority fields store priorities 224 that indicate a priority level of a process of processes 120. In some embodiments, the program counter fields store program counters 225 that point to an address of a next instruction to be executed for a process of processes 120. In some embodiments, the CPU register fields are CPU register fields 226 that store the location at which a process of processes 120 is to be stored for execution in a running state. In some embodiments, the input/output (I/O) information fields store I/O information 227 that lists the I/O devices allocated to a process of processes 120. In some embodiments, the entropic information field stores entropic information 228 (discussed further in detail herein) for use by process 120-1, process 120-2, and process 120-3 to the generate optimum access request times 260 and optimum access requests 291. In some embodiments, the optimum access request times 260 and optimum access requests 291 are used to generate the optimum access request schedule 290 for process 120-1, process 120-2, and process 120-3.

In some embodiments, with reference to FIG. 2E-FIG. 2G, the entropic information 228 includes an arrival time field, a resource requested field, a resource grant status field, a completion time field, a turn-around time field, an access request time field, an access request entropy field, an optimum access request entropy threshold field, optimum entropy access request threshold field, an access granted counter field, an optimum access request time field, an access response field, an optimum access request process position field, and an access request iteration field. In some embodiments, the arrival time fields store an arrival time 251 that indicates an arrival time of the access requests 241 submitted by processes 120 to resource 230. In some embodiments, the resource requested fields store a resource requested indicator 252 that indicates the resource 230 of, for example, processors 102, requested by processes 120. In some embodiments, the resource grant status fields store resource grant statuses 253 that indicate whether the resource 230 requested by processes 120 have been granted or not granted. In some embodiments, the completion time fields store completion times 254 that indicate completion times of the execution of processes 120 that have requested access to the resource 230.

In some embodiments, the turn-around time fields store turn-around times 255 that are execution durations of each process of processes 120 that have requested and been granted access to and executed by resource 230. In some embodiments, optimum access request generators 245 of process-based scheduling system 200 determine the turn-around times 255 of the processes 120 that are granted access during each access request iteration by subtracting arrival times 251 from the completion times 254 for each process of processes 120. In some embodiments, the turn-around times 255 are used by processes 120 to determine smart adaptable access request update parameters (described further in detail herein) that are added to access request times 256 (e.g., initial access request times) to ascertain updated access request times 256 that are used to request access to resource 230.

In some embodiments, the access request time fields store access request times 256 that are the times that processes 120 submit access requests 241 to resource 230. In some embodiments, access request entropy fields store access request entropies 257 that are measurements of the randomness of resource 230 granting access requests 241 to processes 120 at a particular access request time of access request times 256. In some embodiments, the optimum entropy access request threshold fields store optimum access request entropy thresholds 258 that are threshold values that the optimum access request generators 245 use to determine whether access request times 256 are optimum access request times 260. In some embodiments, in order for access requests 241 to be optimum access requests 291, access request entropies 257 associated with access request times 256 of the access requests 241 must be equal to or below the optimum entropy access request thresholds 258. In some embodiments, when the access request entropies 257 are equal to below the optimum entropy access request thresholds 258, the access request times 256 are deemed optimum access request times 260 and are used to generate the optimum access request schedule 290 and the optimum access requests 291.

In some embodiments, the access granted counter fields store access granted counters 259 that are counters that represent a number of times resource 230 has granted access to a process at a particular access request time of access request times 256. In some embodiments, the access granted counters 259 are incremented when a process of processes 120 is granted access by the resource 230. In some embodiments, the entropic information 228 for each process of processes 120 is used by each process to generate the optimum access request schedule 290. In some embodiments, process control block 280-1 stores entropic information 228-1 related to process 120-1, process control block 280-2 stores entropic information 228-2 related to process 120-2, and process control block 280-3 stores entropic information 228-3 related to process 120-3.

In some embodiments, with reference to FIG. 2E-FIG. 2G, process control block 280-1 includes an entropic information 228-1. In some embodiments, entropic information 228-1 includes an arrival time 251-1, a resource requested 252-1, a resource grant status 253-1, a completion time 254-1, a turn-around time 255-1, an access request time 256-1, an access request entropy 257-1, an optimum entropy access request threshold 258-1, an access granted counter 259-1, an optimum access request time 260-1, an access response 261-1, an optimum access request process position 262-1, and an access request iteration 263-1. In some embodiments, process control block 280-2 includes an entropic information 228-2. In some embodiments, entropic information 228-2 includes an arrival time 251-2, a resource requested 252-2, a resource grant status 253-2, a completion time 254-2, a turn-around time 255-2, an access request time 256-2, an access request entropy 257-2, an optimum entropy access request threshold 258-2, an access granted counter 259-2, an optimum access request time 260-2, an access response 261-2, an optimum access request process position 262-2, and an access request iteration 263-2. In some embodiments, process control block 280-3 includes an entropic information 228-3. In some embodiments, entropic information 228-3 includes an arrival time block 251-3, a resource requested 252-3, a resource grant status 253-3, a completion time 254-3, a turn-around time 255-3, an access request time 256-3, an access request entropy 257-3, and optimum entropy access request threshold 258-3, an access granted counter 259-3, an optimum access request time 260-3, an access response 261-3, an optimum access request process position 262-3, and an access request iteration 263-3.

In some embodiments, the process 120-1, the process 120-2, and the process 120-3 are configured to utilize the entropic information 228-1, entropic information 228-2, and the entropic information 228-3 ascertained in process control block 280-1, process control block 280-2, and process control block 280-3 to operate independently to generate the optimum access request times 260 and collectively to generate the optimum access request schedule 290. In some embodiments, the optimum access request schedule 290 is a schedule generated by processes 120 using the access request entropies 257 from the entropic information 228 ascertained in the process control blocks 280. In some embodiments, processes 120 utilize the access request entropies 257 associated with each process in the processes 120 to position the processes 120 in optimum access request process positions 262 and generate the optimum access request times 260 to submit optimum access requests 291 to resource 230. In some embodiments, each process of processes 120 is able to generate an optimum access request process position and optimum access request time, and the individual optimum access request process position and optimum access request time of each process of processes 120 are used to generate the optimum access request schedule 290.

In some embodiments, access request entropies 257 are generated by each process of processes 120 by counting the number of access requests 241 that are granted by resource 230 at an access request time of access request times 256 and assigning an access request entropy value to the access request times 256 based upon the number of access requests 241 that are granted at the access request times 256. In some embodiments, the value of the access request entropies 257 assigned to each access request time of access request times 256 for a particular process of processes 120 may range from 0 to 1, where an access request entropy value of 1 indicates a high level of randomness of resource 230 granting access requests for processes 120 at a particular access request time and an access request entropy value of 0 indicates a low level of randomness of resource 230 granting of access requests of processes 120 at a particular time. Thus, for example, for a particular access request 241 submitted by a process 220 at a particular access request time 256 with an access request entropy 257 value of 1, the likelihood of the access request 241 being granted by resource 230 to the process is minimal. In another example, for a particular access request 241 submitted by a process of processes 120 at a particular access request time 256 with an access request entropy 257 value of 0, the likelihood of the access request 241 being granted by resource 230 to the process is maximum.

In some embodiments, over a plurality of access request iterations of the processes 120 requesting access to resource 230, when process-based scheduling system 200 determines that the access request entropies 257 associated with access request times 256 are equal to or below the optimum entropy access request thresholds 258, the access request times 256 are flagged as optimum access request times 260, stored in entropic information 228, and positioned in the optimum access request schedule 290 by optimum access request generators 245. In some embodiments, the optimum access request schedule 290 is utilized by the processes 120 to indicate the order and time at which the processes should request access to resource 230 to assure that the resource 230 is available for processing.

In some embodiments, in operation of process-based scheduling system 200, prior to execution of processes 120 by resource 230, operating system 107 initially places processes 120 in a ready queue from a job queue (not shown) by operating system 107. In some embodiments, the job queue is configured to store processes 120 in system 100 prior to movement of the processes 120 that are ready for execution and processing by resource 230 to the ready queue. In some embodiments, the ready queue is a queue utilized by operating system 107 to store processes 120 that are ready and waiting to be assigned to resource 230.

In some embodiments, while process 120-1, process 120-2, and process 120-3 are in the ready queue, instead of having operating system 107 schedule processes for access to resource 230 (as is generally known in the art), process 120-1, process 120-2, and process 120-3 commence the process generating optimum access request times 260 that are used to schedule processes 120 in optimum access request schedule 290. In some embodiments, optimum access request generator 245-1 of process 120-1, optimum access request generator 245-2, and optimum access request generator 245-3 ascertain the entropic information 228 from the process control blocks 280. In some embodiments, the entropic information 228 parameters provide an initial access request time 256 for each of the processes 120. In some embodiments, each process of processes 120 updates the initial access request time 256 when, for example, the processes 120 have initiated the initial access requests 241.

In some embodiments, each process of processes 120 requests access to resource 230 at access request times 256. In some embodiments, process 120-1, process 120-2, process 120-3 request access to resource 230 at an access request time 256-1, an access request time 256-2, an access request time 256-3 by submitting an access request 241-1, an access request 241-2, and an access request 241-3, respectively, to resource 230. In some embodiments, each access request time (e.g., access request time 256-1, access request time 256-2, access request time 256-3) is equal to a time, T, plus a smart adaptable access request update parameter, M. In some embodiments, the smart adaptable access request update parameter is a time unit, such as, for example, a millisecond, a second, or some other unit of time, dictated by process-based scheduling system 200. In some embodiments, for example, a millisecond time unit is used to increase the time to submit the access request may be, for example, 1 millisecond, 2 milliseconds, etc. In some embodiments, at the commencement of the initial access request iteration of the optimum access request generation process, the access request time 256-1, the access request time 256-2, the access request time 256-3 of process 120-1, process 120-2, and process 120-3, respectively, each commence at an access request time 256 equal to zero. Thus, for example, for the initial iteration, T is zero (T=0) and M is zero (M=0) for each process during the initial access request iteration.

In some embodiments, each process 120-1, process 120-2, and process 120-3 log the access request times (e.g., access request time 256-1, access request time 256-2, and access request time 256-3) into the associated access request time field of entropic information 228. For example, process 120-1 logs access request time 256-1 into the entropic information 228-1 of process control block 280-1, process 120-2 logs access request time 256-2 into the entropic information 228-2 of process control block 280-2, process 120-3 logs access request time 256-3 into the entropic information 228-3 of process control block 280-3.

In some embodiments, resource 230 receives access request 241-1, access request 241-2, and access request 241-3 from process 120-1, process 120-2, and process 120-3, respectively, and determines whether to grant access to resource 230 to process 120-1, process 120-2, or process 120-3. In some embodiments, resource 230 determines whether to grant access to process 120-1, process 120-2, or process 120-3 based on, for example, whether resource 230 is busy executing another process, another application, etc.

In some embodiments, when resource 230 determines not to grant access to process 120-1, process 120-2, or process 120-3, resource 230 provides an access response 261 to the corresponding process that indicates that access to the resource 230 is not granted. In some embodiments, when resource 230 determines to grant access to process 120-1, process 120-2, or process 120-3, because, for example, resource 230 is not busy executing another process, resource 230 provides an access-granted access response 261 to the appropriated optimum access request generator of optimum access request generators 245.

In some embodiments, each optimum access request generator 245-1, optimum access request generator 245-2, and optimum access request generator 245-3 of processes 120 receives an access response 261-1, access response 261-2, and access response 261-3, from resource 230 and determines the grant or non-grant statuses of the access responses 261. In some embodiments, optimum access request generators 245 determine whether each process has been granted access to resource 230 by reading an associated access response of access responses 261. In some embodiments, optimum access request generators 245 store the statuses of the access responses 261 in the resource grant statuses 253 of entropic information 228 of process control blocks 280.

In some embodiments, when process 120-1, process 120-2, or process 120-3 read the access response and determine that access to resource 230 has not been granted, the processes 120 that have not been granted access to resource 230 increase the access request time 256-1, the access request time 256-2, and/or the access request time 256-3, by the smart adaptable access request update parameter (M). In some embodiments, the smart adaptable access request update parameter is considered smart and adaptable because it may be configured to adapt to, for example, a turn-around time or execution time of a process that is utilizing the resource 230. For example, by analyzing the duration of time between denied access responses 261, the optimum access request generator 245 is configured to estimate the execution time of the process currently be executed on resource 230. In some embodiments, the optimum access request generator 245 may use the estimation of the execution time as the smart adaptable access request update parameter to minimize the likelihood of access request denial during a subsequent access request 241.

In some embodiments, after the processes 120 that have not been granted access to resource 230 increase their corresponding access request times by the smart adaptable access request parameter, each process that has not been granted access to resource 230 requests access to resource 230 repeatedly at updated access request times 256. In some embodiments, the access request times 256 are increased by the smart adaptable access request parameter during each access request iteration until resource 230 grants access to the processes.

In some embodiments, when optimum access request generator 245-1 of process 120-1, optimum access request generator 245-2 of process 120-2, and optimum access request generator 245-3 of process 120-3 read the access response 261 and determine that access to resource 230 has been granted, the processes that have been granted access to resource 230 update the resource grant status field and the access granted counter field of entropic information 228 accordingly. In some embodiments, as stated previously, the resource grant status 253-1, resource grant status 253-2, and resource grant status 253-3 indicate the status of the access responses 261 and the access granted counter 259-1, access granted counter 259-2, and access granted counter 259-3 indicate the frequency or number of times process 120-1, process 120-2, and process 120-3 have been granted at the current access request time 256-2, access request time 256-2, access request time 256-3.

In some embodiments, after optimum access request generators 245 update the resource grant status 253 and access granted counters 259, optimum access request generators 245 determine whether the access request granted by resource 230 occurred during an initial access request time 256. In some embodiments, in order to determine whether access request granted by resource 230 occurred during an initial access request time 256, optimum access request generators 245 check the access request iteration field of entropic information 228 to determine if the access request iteration 263 is equal to 1, which is a number indicative of the current access request iteration.

In some embodiments, when optimum access request generators 245 determine that the access request 241 granted by resource 230 occurred during the initial access request time 256, optimum access request generators 245 designate the access request time 256 as the optimum access request time 260. In some embodiments, each set of processes 120 contending for access to resource 230 during overlapping access request iterations has a process of processes 120 with an access request time that is granted during the initial access request iteration 263.

In some embodiments, after the optimum access request generators 245 have designated access request times 256 as optimum access request times 260, the optimum access request generators 245 position processes 120 according to the optimum access request times 260 in the optimum access request schedule 290. In addition, optimum access request generators 245 update or lock the access request times 256 with the optimum access request time 260 such that the processes 120 associated with the optimum access request times 260 uses the optimum access request times 260 for subsequent access request iterations.

In some embodiments, when optimum access request generators 245 determine that access requests 241 granted by resource 230 did not occur during initial access request times 256, optimum access request generators 245 read the access granted counters 259 and determine access request entropies 257 that correspond to the access request times 256. In some embodiments, for example, the optimum access request generator 245-1, optimum access request generator 245-2, optimum access request generator 245-3 read the access granted counter 259-1, access granted counter 259-2, and access granted counter 259-3 and determine the access request entropy 257-1, access request entropy 257-2, and access request entropy 257-3 that corresponds to the access request time 256-1, access request time 256-2, access request time 256-3. In some embodiments, the access request entropies 257 are determined by the optimum access request generators 245 for each process by counting the number of access requests 241 that have been granted by resource 230 at the current access request times 256. In some embodiments, the optimum access request generator 245 assign access request entropy values to the access request times 256 associated with the access requests 241 based upon the number of access requests 241 that are granted at the access request times 256. In some embodiments, as stated previously, the value of the access request entropies 257 assigned to each access request time of access request times 256 for a particular process of processes 120 may range from 0 to 1, where an access request entropy value of 1 indicates a high level of randomness of resource 230 granting access requests for processes 120 at a particular access request time and an access request entropy value of 0 indicates a low level of randomness of resource 230 granting of access requests of processes 120 at a particular access request time.

In some embodiments, after generating the access request entropies 257, the optimum access request generators 245 determine whether the access request entropies 257 are equal to or below the optimum entropy access request thresholds 258. In some embodiments, when the optimum access request generator 245 determines that the access request entropies 257 are not equal to or below the optimum entropy access request threshold 258, the optimum access request generators 245 set the granted access request times 256 as the access request times 256 and proceed to request access to resource 230 at the granted access request times 256.

In some embodiments, when the optimum access request generators 245 determine that access request entropies 257 are below the optimum entropy access request thresholds 258, the optimum access request generators 245 designate the access request times 256 associated with the access requests 241 as optimum access request times 260. In some embodiments, after the optimum access request generators 245 have designated access request times 256 as optimum access request times 260, the optimum access request generators 245 position processes 120 according to the optimum access request times 260 in the optimum access request schedule 290. In addition, optimum access request generators 245 update or lock the access request times 256 with the optimum access request time 260 such that the processes 120 associated with the optimum access request times 260 uses the optimum access request times 260 for subsequent access request iterations.

In some embodiments, process-based scheduling system 200 is an improvement over existing computer systems because, for example, instead of system 100 utilizing a scheduler dispatch in operating system 107 to schedule processes 120, system 100 uses the processes 120 of process-based scheduling system 200 to schedule the processes 120 for execution on resource 230. In some embodiments, processes 120 of process-based scheduling system 200 utilize optimum access request generators 245 to generate optimum access requests 291 that are used by process-based scheduling system 200 to generate an optimum access request schedule 290. In some embodiments, in order to generate the optimum access requests 291, the processes 120 of process-based scheduling system 200 are configured to utilize historical information accumulated during iterations of access requests 241 to resource 230 by processes 120. In some embodiments, the historical information includes entropic information for processes 120 that is used by the optimum access request generators 245 to generate the optimum access request schedule 290 for the processes 120.

Figure 3A:
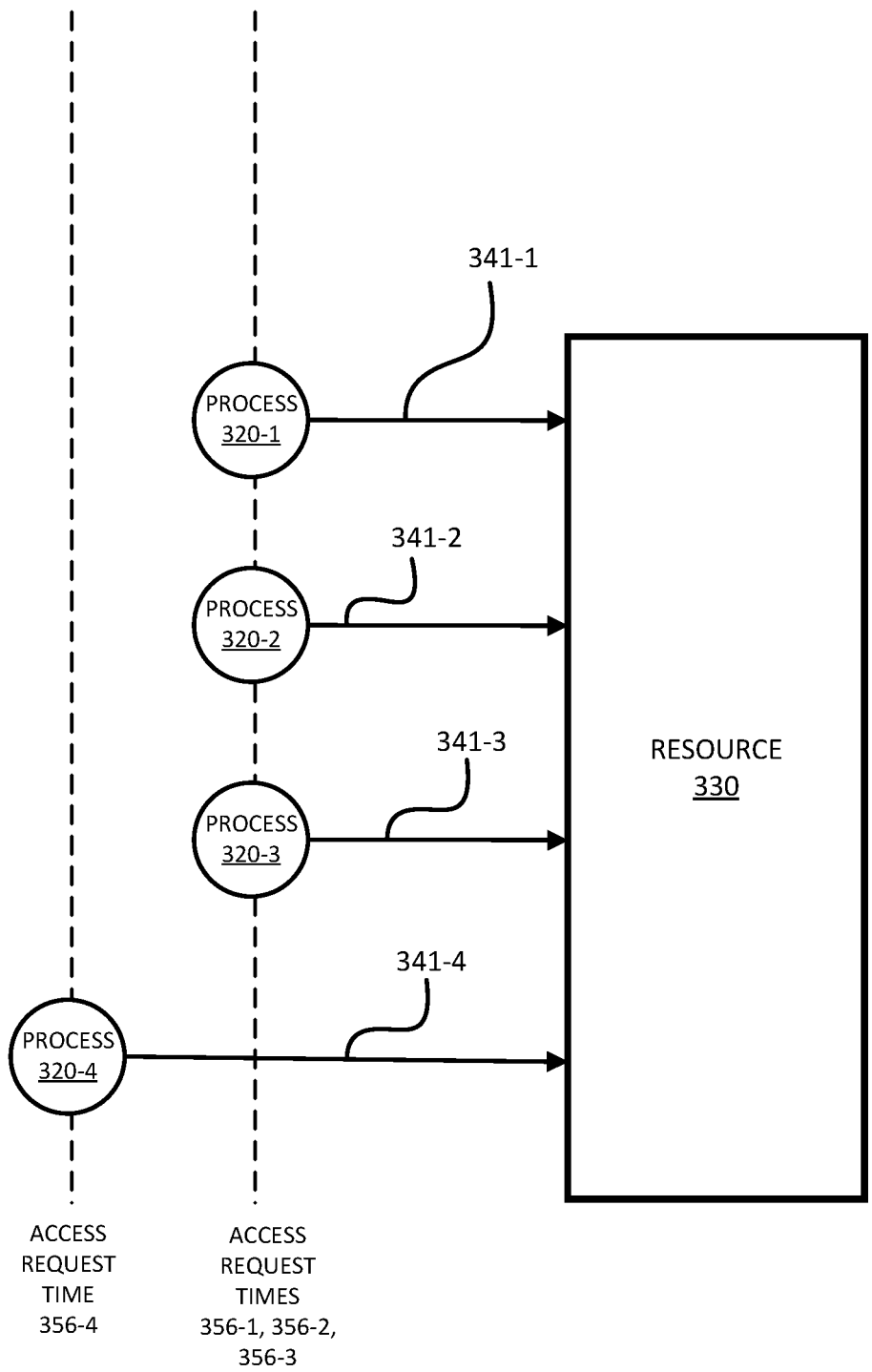
FIG. 3A-FIG. 3C illustrate an example implementation of process-based scheduling in accordance with some embodiments.

FIG. 3A-FIG. 3H illustrate an example implementation of process-based scheduling of optimum access requests 391 by processes 320 whose optimum access request times 360 are used to generate an optimum access request schedule 390. FIG. 3A illustrates a process 320-1, a process 320-2, a process 320-3, and a process 320-4 that contend for access to resource 330 using access requests 341 at access request times 356 and generate the optimum access request times 360 and the optimum access request schedule 390. In some embodiments, FIG. 3A-FIG. 3H illustrate the generation of the optimum access request times 360 and optimum access requests 391 during fifteen access request iterations 363 (depicted in detail in FIG. 3H). In some embodiments, as depicted in FIG. 3A and FIG. 3H and described further in detail herein, process 320-1, process 320-2, and process 320-3 initially contend for access to resource 330 at access request time 356-1, access request time 356-2, and access request time 356-3 during access request iteration 363-1-1 access request iteration 363-1-1, whereas process 320-4 initially contends for access to resource 330 during access request iteration 363-5 at a subsequent access request time 356-4. In some embodiments, for example, process 320-4 does not contend for access to resource 330 during access request iteration 363-1, but instead enters contention for access to resource 330 during access request iteration 363-5.

Figure 3B:
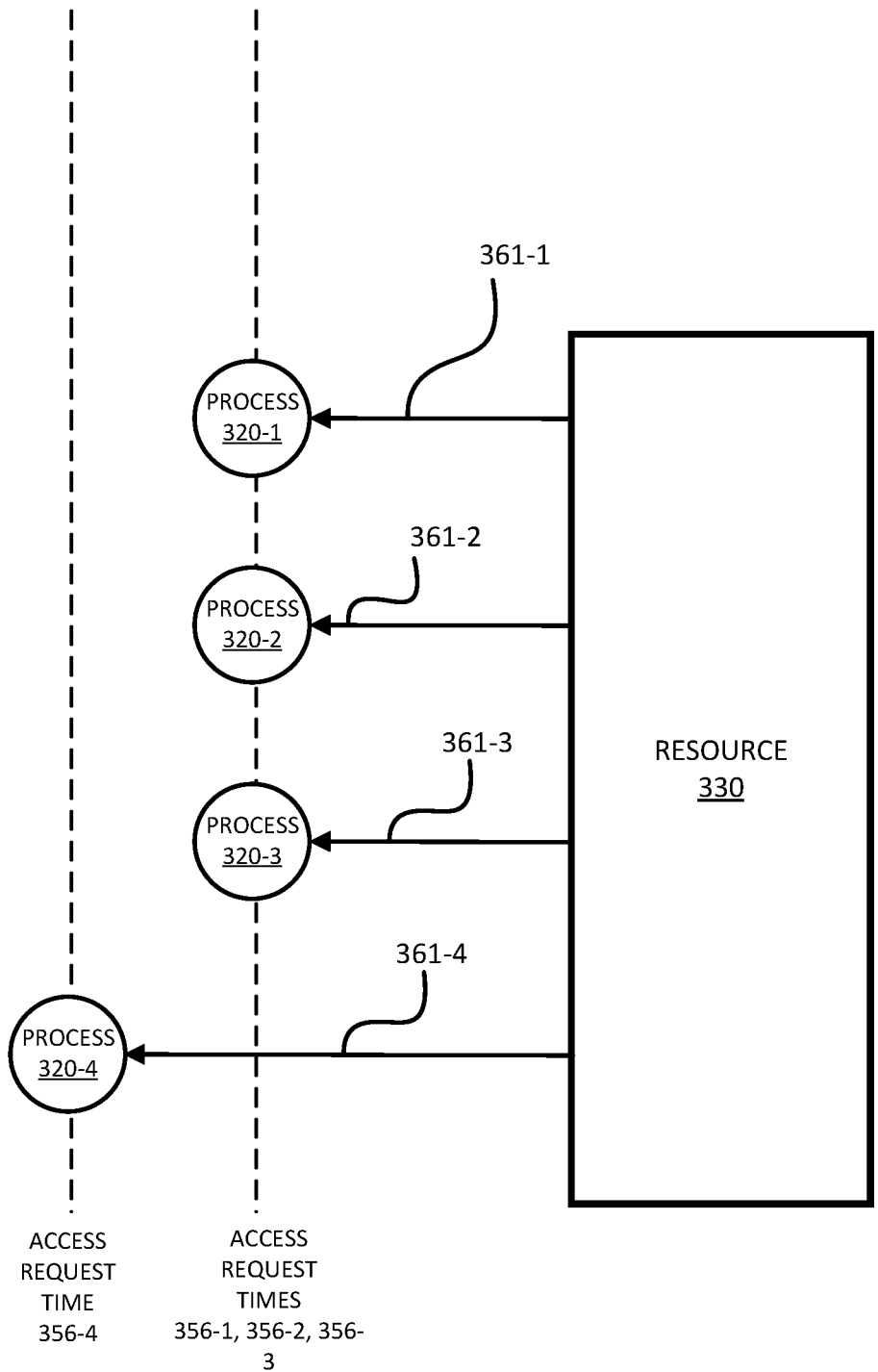
Figure 3C:
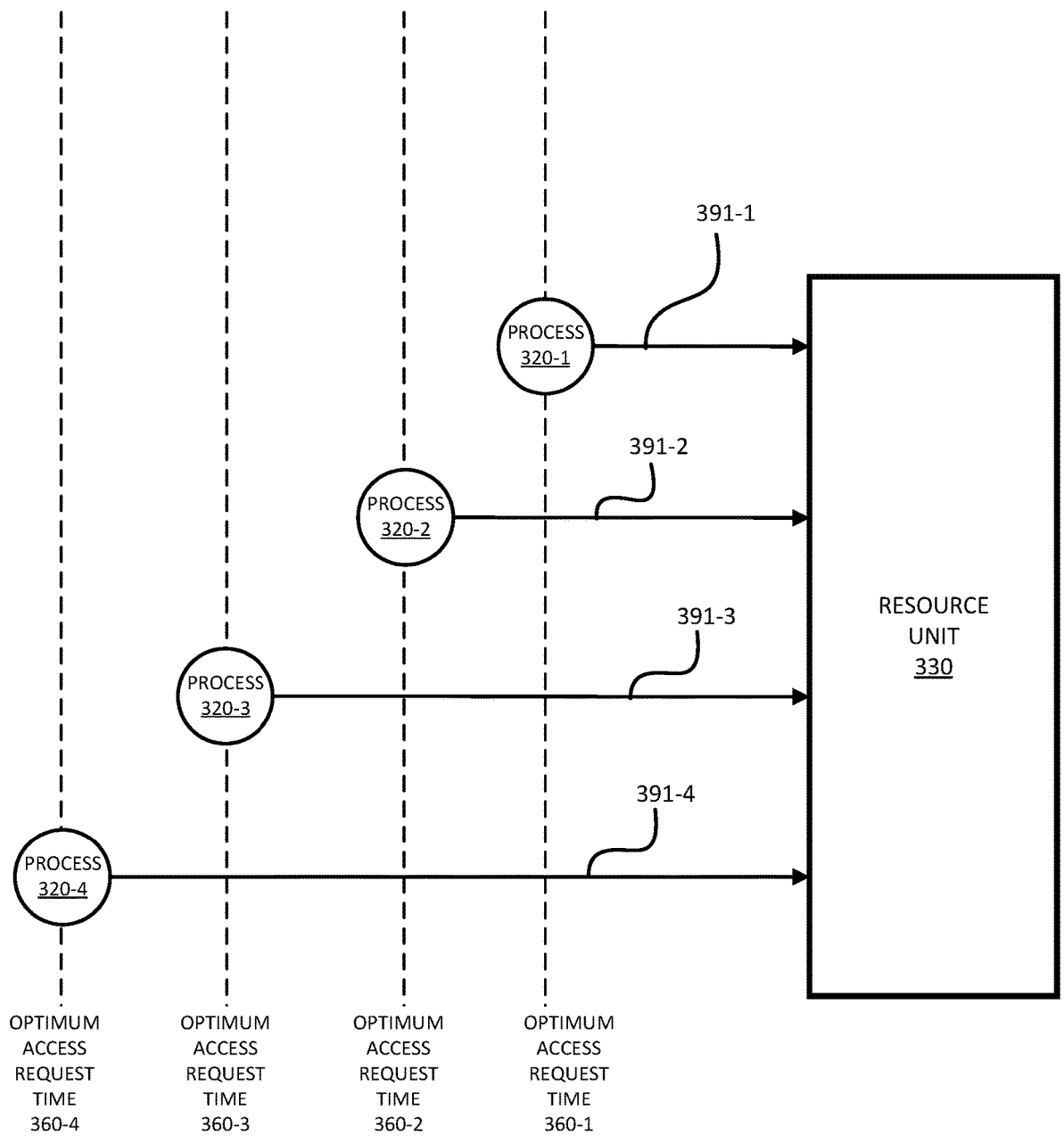
Figure 3D:
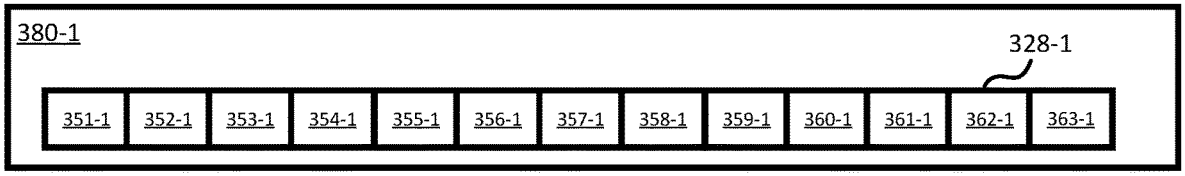
FIG. 3D-FIG. 3G illustrate process control blocks that include entropic information used in the example implementation of the process-based scheduling of FIG. 3A-FIG. 3C in accordance with some embodiments.
Figure 3E:
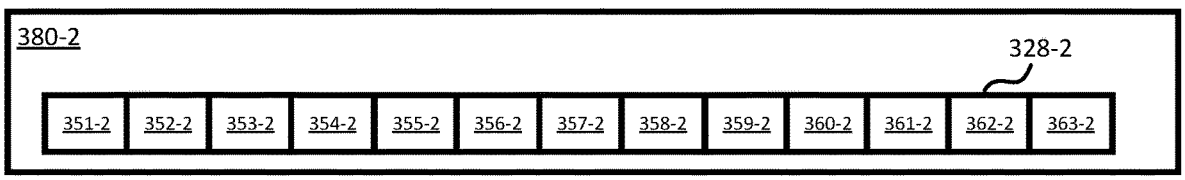
Figure 3F:
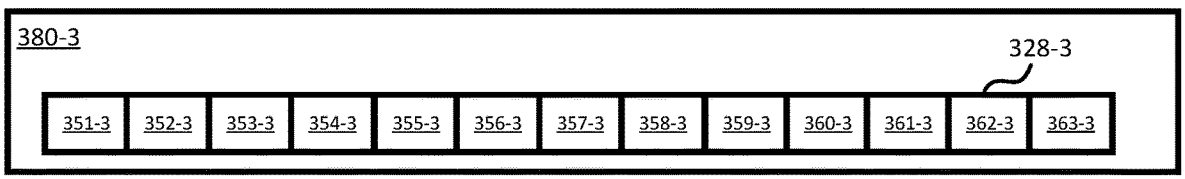
Figure 3G:
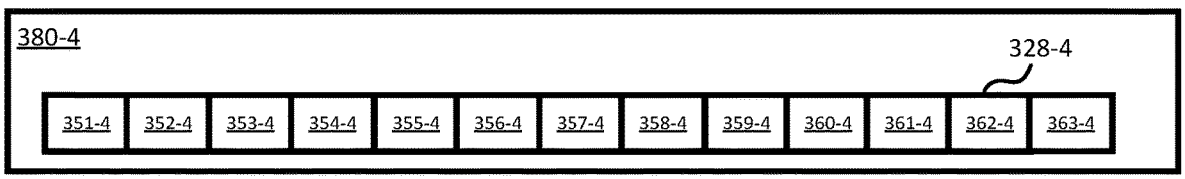

In some embodiments, FIG. 3B illustrates process 320-1, process 320-2, process 320-3, and process 320-4 receiving access responses 361 (e.g., access response 361-1, access response 361-2, access response 361-3, and access response 361-4) from resource 330 in response to access requests 341. In some embodiments, FIG. 3C illustrates process 320-1, process 320-2, process 320-3, and process 320-4 positioned according to the optimum access request times 360 (e.g., optimum access request time 360-1, optimum access request time 360-2, optimum access request time 360-3, and optimum access request time 360-4) generated by each process. In some embodiments, FIG. 3D-FIG. 3G illustrate process control block 380-1, process control block 380-2, process control block 380-3, and process control block 380-4 that are associated with process 320-1, process 320-2, process 320-3, and process 320-4, respectively.

In some embodiments, FIG. 3H illustrates an access request iteration table 397 that exemplifies the process-based scheduling system using processes 320 to generate optimum access request times 360 and optimum access requests 391 during access request iterations 363 using entropy information 380. In some embodiments, access request iteration table 397 includes access request iterations 363, processes 320, access request times 356, resource grant statuses 353, access granter counters 359, optimum access request times 360, and optimum access request schedule 390. In some embodiments, the access request iteration table 397 includes fifteen access request iterations 363 of access requests 341, although the number of access request iterations may vary depending on, for example, the number of processes 320 or a length of time required to generate optimum access requests 391 for each process.

In some embodiments, with reference to FIG. 3D-FIG. 3G, process control block 380-1 includes entropic information 328-1. In some embodiments, entropic information 328-1 includes an arrival time 351-1, a resource requested 352-1, a resource grant status 353-1, a completion time 354-1, a turn-around time 355-1, an access request time 356-1, an access request entropy 357-1, an optimum entropy access request threshold 358-1, an access granted counter 359-1, an optimum access request time 360-1, an access response 361-1, an optimum access request process position 362-1, and an access request iteration 363-1.

In some embodiments, process control block 380-2 includes entropic information 328-2. In some embodiments, entropic information 328-2 includes an arrival time 351-2, a resource requested 352-2, a resource grant status 353-2, a completion time 354-2, a turn-around time 355-2, an access request time 356-2, an access request entropy 357-2, an optimum entropy access request threshold 358-2, an access granted counter 359-2, an optimum access request time 360-2, an access response 361-2, an optimum access request process position 362-2, and an access request iteration 363-2.

In some embodiments, process control block 380-3 includes entropic information 328-3. In some embodiments, entropic information 328-3 includes an arrival time block 351-3, a resource requested 352-3, a resource grant status 353-3, a completion time 354-3, a turn-around time 355-3, an access request time 356-3, an access request entropy 357-3, and optimum entropy access request threshold 358-3, an access granted counter 359-3, an optimum access request time 360-3, an access response 361-3, an optimum access request process position 362-3, and an access request iteration 363-3.

In some embodiments, process control block 380-4 includes entropic information 328-4. In some embodiments, entropic information 328-4 includes an arrival time 351-4, a resource requested 352-4, a resource grant status 353-4, a completion time 354-4, a turn-around time 355-4, an access request time 356-4, an access request entropy 357-4, optimum entropy access request threshold 358-4, an access granted counter 359-4, optimum access request time 360-4, an access response 361-4, an optimum access request process position 362-4, and an access request iteration 363-4.

In some embodiments, with reference to FIG. 3A—FIG. 3H, based on entropic assessments of entropic information 328 by processes 320 using, for example, access responses 361 provided from resource 330, processes 320 independently generate optimum access request 391-1, optimum access request 391-2, optimum access request 391-3, and optimum access request 391-4, respectively. In some embodiments, the entropic assessments utilize entropic information 328-1, entropic information 328-2, entropic information 328-3, entropic information 328-4 of process control block 380-1, process control block 380-2, process control block 380-3, and process control block 380-4, respectively, to generate the optimum access request times 360 and the optimum access requests 391.

In some embodiments, the entropic assessments are performed by optimum access request generators (depicted in, for example, FIG. 2A) that allow processes 320 to generate optimum access request time 360-1, optimum access request time 360-2, optimum access request time 360-3, optimum access request time 360-4, and optimum access request schedule 390. In some embodiments, the ascending combination of optimum access request time 360-1, optimum access request time 360-2, optimum access request time 360-3, and optimum access request time 360-4, determined by, for example, the optimum access request generators of FIG. 2, yield the optimum access request schedule 390.

In some embodiments, for the example depicted in FIG. 3A—FIG. 3H, the optimum access request generation process iterates through the fifteen access request iterations before generating optimum access request times 360 for all processes 320. In some embodiments, the optimum access request times 360 for each individual process (e.g., process 320-1, process 320-2, process 320-3, and process 320-4) occur during individual access request iterations 363. For example, in FIG. 3H, the optimum access request time 360-1 for process 320-1 occurs during access request iteration 363-1-1 (e.g., the first iteration for process 320-1), the optimum access request time 360-2 for process 320-2 occurs during access request iteration 363-2-7 (e.g., the seventh iteration for process 320-2), the optimum access request time 360-3 for process 320-3 occurs during access request iteration 363-3-12 (e.g., the twelfth iteration for process 320-3), the optimum access request time 360-4 for process 320-4 occurs during access request iteration 363-4-11 (e.g., the eleventh iteration for process 320-4). In alternate embodiments, the number of access request iterations 363 may vary depending on, for example, the number of processes 320 or a length of time required to generate optimum access requests 391 for each process.

In some embodiments, with reference to FIG. 3A-FIG. 3H, initially, during a first access request iteration 363 (e.g., access request iteration 363-1-1, access request iteration 363-2-1, access request iteration 363-3-1) of the optimum access request generation process, process 320-1, process 320-2, and process 320-3 contend for access to resource 330 at an access request time 356-1, an access request time 356-2, and an access request time 356-3 by submitting an access request 341-1, access request 341-2, and access request 341-3, respectively, to resource 330. In some embodiments, as stated previously, during the first access request iteration 363 (e.g., access request iteration 363-1-1, access request iteration 363-2-1, access request iteration 363-3-1), process 320-4 is not yet contending for access to resource 330, instead process 320-4 is waiting for a subsequent access request iteration (e.g., access request iteration 363-1-5, access request iteration 363-2-5, access request iteration 363-3-5) to request access to resource 330.

In some embodiments, as stated previously, each access request time 356 is equal to a smart adaptable access request update parameter (M) added to a time (T). In some embodiments, as depicted in FIG. 3H for the processes 320 of FIG. 3A, at the commencement of the first access request iteration of the optimum access request generation process, access request time 356-1 of process 320-1, access request time 356-2 of process 320-2, and access request time 356-3 of process 320-3, are each set to an access request time equal to zero. Thus, for the initial access request iteration 363-1-1, access request iteration 363-2-1, access request iteration 363-3-1, T is zero (T=0) and M is zero (M=0) for process 320-1, process 320-2, and process 320-3, respectively.

In some embodiments, after submitting the access requests 341 to resource 330, each process 320-1, process 320-2, and process 320-3 logs the time the access request 341 into the entropy information fields associated with access request time 356-1, access request time 356-2, and access request time 356-3, respectively. For example, process 320-1 logs access request time 356-1 into the entropic information 328-1 of process control block 380-4, process 320-2 logs access request time 356-2 into the entropic information 328-2 of process control block 380-2, process 320-3 logs access request time 356-3 into the entropic information 328-3 of process control block 380-3.

In some embodiments, resource 330 receives access request 341-1 from process 320-1, access request 341-2 from process 320-2, and access request 341-3 from process 320-3 and either grants or denies access to each process 320-1, process 320-2, and process 320-3. In some embodiments, as stated previously, resource 330 grants or denies access to process 320-1, process 320-2, or process 320-3, depending on, for example, whether resource 330 is busy or otherwise being utilized by other processes, applications, etc., during the current access request time. In some embodiments, for the example given in FIGS. 3A—FIG. 3G, during the first access request iteration (e.g., access request iteration 363-1-1, access request iteration 363-2-1, access request iteration 363-3-1), resource 330 grants access to process 320-1 using access response 361-1 and denies access to process 320-2 and process 320-3 using access response 361-2 and access response 361-3, respectively.

In some embodiments, as depicted in FIG. 3B, process 320-1 receives access response 361-1 and, in addition to logging the access response 361-1 into access response field of entropic information 228-1 associated with the access request time 356-1, assesses the access response 361-1 to determine whether the access request 341-1 was denied or granted by resource 330. In some embodiments, process 320-1 determines that the access request 341-1 has been granted by resource 330 and proceeds to make an entry into resource grant status 353-1 and updates access granted counter 359-1. In addition, process 320-1 determines whether the access request 341-1 to resource 330 has been granted during the first access request iteration 363-1-1 at the first access request time 356-1.

In some embodiments, for the example depicted in FIG. 3A-FIG. 3H, when process 320-1 determines that the access request 341-1 to resource 330 has been granted during the first access request iteration 363-1-1 at the first access request time 356-1, process 320-1 designates the access request time 356-1 that corresponds to the first access request iteration 363-1-1 as an optimum access request time 360-1 for use in optimum access request schedule 390. In some embodiments, the optimum access request time 360-1 is at access request time T+0, with T and M equaling 0 (depicted in FIG. 3H).

In some embodiments, as can be seen by inspection of FIG. 3C and FIG. 3H, because access request time 356-1 of process 320-1 has been designated as optimum access request time 360-1, process 320-1 uses the optimum access request time 360-1 for the first optimum access request process position 362-1 of the optimum access request schedule 390 and for subsequent iterations of the optimum access request generation process. Thus, in some embodiments, by attaining the first optimum access request time 360-1 during the initial access request iteration 363-1 (in this example prior to process 320-2 and process 320-3), process 320-1 is assigned the first optimum access request process position 362-1 in the optimum access request schedule 390 (depicted in FIG. 3H).

In some embodiments, referring now to process 320-2 in FIG. 3H, process 320-2 receives access response 361-2 and determines that the access request 341-2 has not been granted by resource 330. Process 320-2 proceeds to make a not-granted status entry into resource grant status 353-2 and increase access request time 356-2 by the smart adaptable access request parameter. As discussed previously, in some embodiments, the smart adaptable access request update parameter is an adaptable amount of time that is added to the time T to generate an updated access request time 356-2. In some embodiments, for the example of process 320-2 given in FIG. 3A-FIG. 3G, the smart adaptable access request update parameter is 1 for access request iteration 363-2-1 through access request iteration 363-2-15 and the time T is 0 during the first access request iteration 363-2-1. In some embodiments, since time T is 0 and smart adaptable access request update parameter M equals 1, the access request time 356-2 is 0+1, which is 1, for the first access request iteration 363-2-1.

In some embodiments, during subsequent access request iterations 363 (e.g., access request iteration 363-2-2 through access request iteration 363-2-15), process 320-2 continues to assess the access responses 361-2 from resource 330 and, when the access request 341-2 has not been granted, increases access request time 356-2 by the smart adaptable access request update parameter until the access request 341-2 is granted. In some embodiments, when process 320-2 determines that access to resource 330 has been granted (in this example at access request iteration 363-2-5), process 320-2 updates the resource grant status 353-2 and access granted counter 359-2 and, determines whether the access was granted during the initial access request time 356-2 (e.g., the access request time 356-2 of the initial access request iteration 363-2-1). In some embodiments, since access request 341-2 was not granted during the initial access request time 356-2, process 320-2 uses the access granted counter 359-2 to determine the access request entropy 357-2 that corresponds to the access request time 356-2 (in order to determine whether the granted access request time 356-2 is to be designated the optimum access request time 360-2 for process 320-2).

In some embodiments, as exemplified in FIG. 3H, for access request iteration 363-2-5 and access request iteration 363-2-6, process 320-2 determines that the access request entropies 357-2 are not equal to or below the optimum entropy access request threshold 358-2 and does not designate the corresponding access request time 356-2 as optimum access request time 360-2. In some embodiments, process 320-2 continues to use the access request time 356-2 (in this case, T+4) for access requests 341-2 until, at access request iteration 363-2-7, process 320-2 determines that the access request entropy 357-2 is below the optimum entropy access request threshold 358-2.

In some embodiments, after determining that the access request entropy 357-2 has met the optimum entropy access request threshold 358-2, process 320-2 designates the access request time 356-2 associated with the access request 341-2 at access request iteration 363-7 (for this example, T+4) as the optimum access request time 360 for process 320-2.

In some embodiments, process 320-2 stores the optimum access request time 360-2 into entropic information 328-2 and updates the access request time 356-2 for the subsequent access request iterations 363 to keep the optimum access request time 360-2 as the access request time during subsequent access request iterations 363 (e.g., access request iteration 363-2-8 through access request iteration 363-2-15). In some embodiments, process 320-2 positions the optimum access request time 360-2 into optimum access request schedule 390 as the designated optimum access request time 360-2 (as depicted in FIG. 3H). In some embodiments, process 320-2 locks the optimum access request time 360-2 as the access request time 356-2 that is to be used to generate optimum access requests 391-2 that are provided to resource 330.

In some embodiments, referring now to process 320-3 in FIG. 3H, process 320-3 receives access response 361-3 from resource 330 and determines whether access request 341-3 has been granted or not granted by resource 330. In some embodiments, when process 320-3 determines that the access request 341-3 has not been granted by resource 330, such as, for example, in access request iteration 363-3-1, access request iteration 363-3-2, access request iteration 363-3-3, access request iteration 363-3-5, access request iteration 363-3-6, access request iteration 363-7, access request iteration 363-3-8, and access request iteration 363-3-9, process 320-3 proceeds to make a not-granted status entry into resource grant status 353-3, increase access request time 356-3 by the smart adaptable access request parameter (which in this case is 1), and submit access requests 341-3 to resource 330. In some embodiments, process 320-3 continues to assess the access responses 361-3 from resource 330 made in response to the access requests 341-3 and, while the access request 341-3 is not granted, increase access request time 356-3 by the smart adaptable access request update parameter until the access request 341-3 is granted.

In some embodiments, when process 320-3 determines that access to resource 330 has been granted (in this example at access request iteration 363-3-4 and access request iteration 363-3-10), process 320-3 updates the resource grant status 353-3 and access granted counter 359-3 and determines whether the access request 343-3 was granted during the initial access request time 356-3 (e.g., the access request time 356-3 of the initial access request iteration 363-3-1).

In some embodiments, for the example in FIG. 3H, process 320-3 determines that access request 341-3 has not been granted during the initial access request time 356-3 for both access request iteration 363-3-4 and access request iteration 363-3-10. In some embodiments, process 320-3 proceeds to use the access granted counter 359-3 to determine the access request entropies 357-3 that correspond to the access request times 356-3 for access request iteration 363-3-4 and access request iteration 363-3-10 (in order to determine whether the granted access request times 356-3 are to be designated optimum access request times 360-3 for process 320-3).

In some embodiments, during access request iteration 363-4-4 and access request iteration 363-11, process 320-3 determines that the access request entropies 357-3 are not equal to or below the optimum entropy access request threshold 358-3 and does not designate the corresponding access request time 356-3 as optimum access request time 360-3. In some embodiments, process 320-3 proceeds to use the access request time 356-3 corresponding to the granted access request 341-3 to request access to resource 330 during access request iteration 363-3-5 and access request iteration 363-3-11.

In some embodiments, with reference to access request iteration 363-3-5, process 320-3 determines that access request 341-3 is not granted during access request iteration 363-3-5 and, as stated previously, proceeds to increment access request time 356-3 by the smart adaptable update parameter and request access to resource 330 until access is granted in access request iteration 363-3-10.

In some embodiments, after access is granted by resource 330 in access request iteration 363-3-10, process 320-3 updates resource grant status 353-3 and access granted counter 359-3 as described previously. In some embodiments, after updating resource grant status 353-3 and access granted counter 359-3, and since, as stated previously, the access request 343-3 was not granted during the initial access request time 356-3, process 320-3 proceeds to request access to resource 330 using the granted access request time 356-3, which, for this example, is T+8 (illustrated in FIG. 3H). In some embodiments, process 320-3 continues to use the access request time 356-3 (e.g., T+8) for access requests 341-3 until, at access request iteration 363-3-12, process 320-3 determines that the access request entropy 357-3 has met the optimum entropy access request threshold 358-3 (e.g., is equal to or below the optimum entropy access request threshold 358-3).

In some embodiments, after process 320-3 determines that the access request entropy 357-3 has met the optimum entropy access request threshold 358-3, process 320-3 designates the access request time 356-3 associated with the access request 341-3 at access request iteration 363-3-12 (for this example, T+8) as the optimum access request time 360-3 for process 320-3.

In some embodiments, process 320-3 stores the optimum access request time 360-3 into entropic information 328-3 and updates the access request time 356-3 for the subsequent access request iterations 363 to keep the optimum access request time 360-3 during subsequent access request iterations 363 (e.g., access request iteration 363-3-13, access request iteration 363-3-14, and access request iteration 363-3-15). In some embodiments, process 320-3 positions the optimum access request time 360-3 into optimum access request schedule 390 at the designated optimum access request time 360-3 (as depicted in FIG. 3H). In some embodiments, process 320-3 locks the optimum access request time 360-3 as the access request time 356-3 that is to be used to generate optimum access requests 391-3 to resource 330.

In some embodiments, referring now to process 320-4 in FIG. 3H, during access request iteration 363-4-1 (in this example, during the fifth access request iteration of process 320-1, process 320-2, and process 320-3), process 320-4 submits an initial access request 341-4 at an access request time 356-4 of T+2, where the smart adaptable access request parameter is 1. In some embodiments, the initial access request time of T+2 has been selected by process 320-4 because, for example, the other processes 320 (e.g., process 320-1, process 320-2, and process 320-3) have previously commenced the optimum access request process at access request iteration 363-4-1. In some embodiments, the initial access request time of T+2 may be arbitrarily selected as a default parameter by process 320-4 since process 320-4 may be unaware of the processes 320 that are in contention for resource 330.

In some embodiments, during access request iteration 363-4-1, process 320-4 receives access response 361-4 from resource 330 in response to access request 341-4 and determines that the access request 341-4 has not been granted by resource 330. In some embodiments, process 320-4 proceeds to make a not-granted status entry into resource grant status 353-4, increase access request time 356-4 by the smart adaptable access request parameter (which in this case is 1), and submit an access request 341-4 to resource 330.

In some embodiments, in response to access request 341-4 submitted by process 320-4 to resource 330, process 320-4 receives access response 361-4 from resource 330 during access request iteration 363-4-2 and determines that the access request 341-4 has not been granted by resource 330. In some embodiments, as was the case during access request iteration 363-4-1, process 320-4 proceeds to make a not-granted status entry into resource grant status 353-4, increase access request time 356-4 by the smart adaptable access request parameter, and submit an access request 341-4 to resource 330.

In some embodiments, after process 320-4 receives access response 361-4 from resource 330 in response to access request 341-4, process 320-4 continues to assess the access responses 361-4 from resource 330 and whilst the access request 341-4 is not being granted, increases access request time 356-4 by the smart adaptable access request update parameter until the access request 341-4 is granted at access request iteration 363-4-10. For example, for the subsequent access request iterations for the example in FIG. 3H, process 320-4 determines that access request 341-4 has been granted in access request iteration 363-4-3, has not been granted in access request iteration 363-4-4, has been granted in access request iteration 363-4-5, has not been granted in access request iteration 363-4-6, has not been granted in access request iteration 363-4-7, has not been granted in access request iteration 363-4-8, and has not been granted in access request iteration 363-9. Thus, as exemplified in FIG. 3H, for the access requests 341-4 that have not been granted, process 320-4 updates the smart adaptable access request update parameter until the access request 341-4 is granted at access request iteration 363-4-10.

In some embodiments, when process 320-4 determines that access to resource 330 has been granted (in this example at access request iteration 363-4-10), process 320-3 updates the resource grant status 353-4 and access granted counter 359-4 and determines that the access has been not granted during the initial access request time 356-4 (e.g., the access request time 356-4 of the initial access request iteration 363-4-1). In some embodiments, since access to access request 341-4 has not been granted at the initial access request time 356-4 during the initial access request iteration 363-4-1, process 320-4 uses the access granted counter 359-4 to determine the access request entropy 357-4 that corresponds to the access request time 356-4 (in order to determine whether the granted access request time 356-4 is to be designated the optimum access request time 360-4 for process 320-4).

In some embodiments, during access request iteration 363-4-10, process 320-4 determines that the access request entropy 357-4 is not below the optimum entropy access request threshold 358-4 and proceeds to request access to resource 330 at the granted access request time 356-4 (e.g., T+9).

In some embodiments, during access request iteration 363-4-11, process 320-4 determines that the access request entropy 357-4 is below the optimum entropy access request threshold 358-4 and proceeds to designate the access request time 356-4 associated with the access request 341-4 at access request iteration 363-4-11 (exemplified as T+9 in FIG. 3H) as the optimum access request time 360-4 for process 320-4.

In some embodiments, process 320-4 stores the optimum access request time 360-4 into entropic information 328-4 and updates the access request time 356-4 for the subsequent access request iterations 363 to keep the optimum access request time 360-4 during subsequent access request iterations 363 with the current processes 320. In some embodiments, process 320-4 positions the optimum access request time 360-4 into optimum access request schedule 390 as the designated optimum access request time 360-4 (as depicted in FIG. 3H). In some embodiments, process 320-4 locks the optimum access request time 360-4 as the access request time 356-4 that is to be used to generate optimum access requests 391-4 to resource 330.

Figure 4:
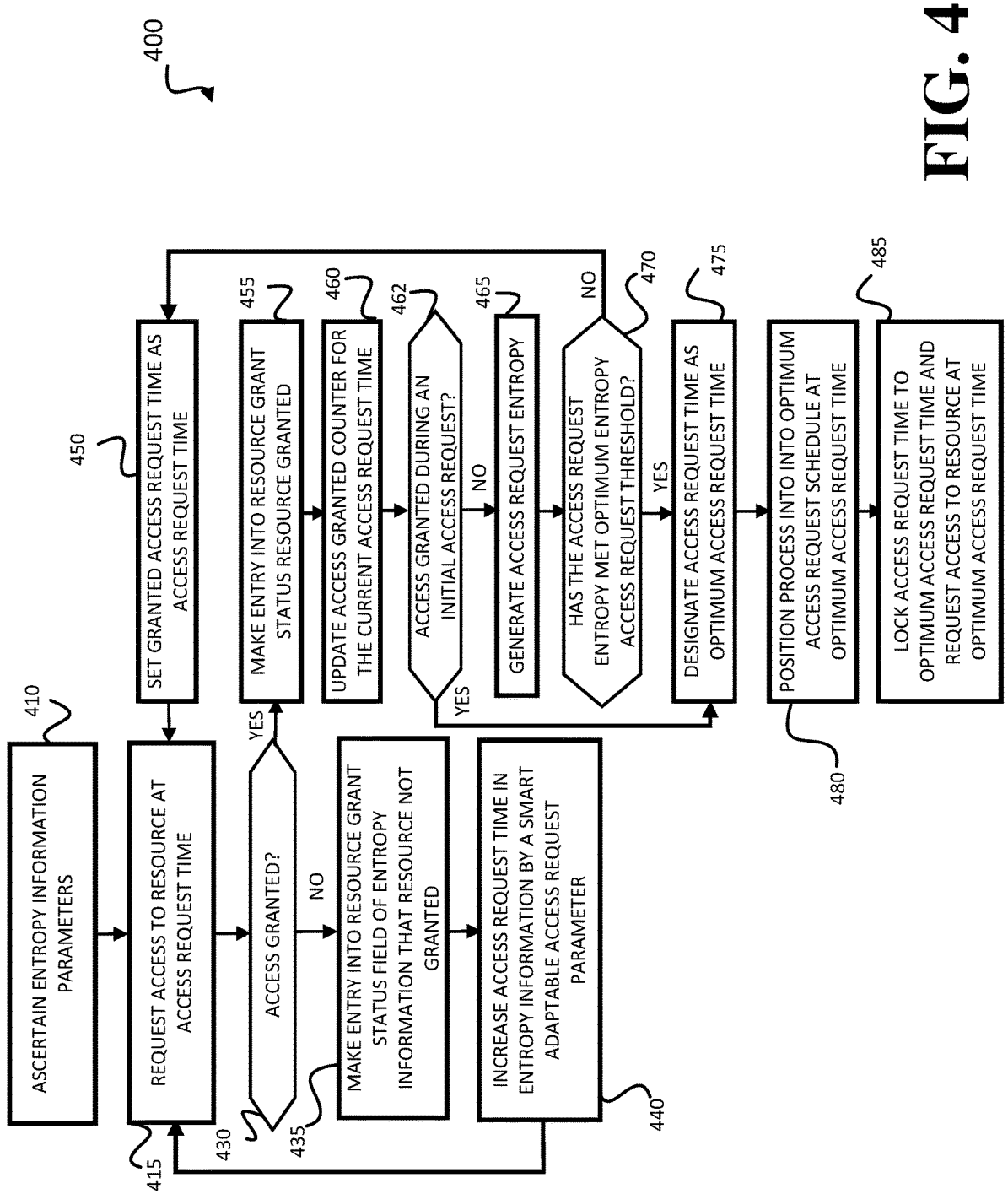
FIG. 4 is a flow diagram illustrating a method for performing process-based scheduling of FIG. 1 in accordance with some embodiments.

FIG. 4 illustrates a method 400 for generating optimum access request times 260 for optimum access request scheduling in accordance with some embodiments. In some embodiments, with reference to FIGS. 1-2, at block 410, optimum access request generators 245 ascertain entropic information 228 parameters from process control blocks 280. In some embodiments, at block 415, processes 120 request access to resource 230 using access requests 241 at access request times 256. In some embodiments, at block 430, optimum access request generators 245 determine whether access has been granted to resource 230 in response to access requests 241. In some embodiments, at block 435, when optimum access request generators 245 determine that access has not been granted to processes 120, optimum access request generators 245 insert entries into resource grant status fields that the access requests to resource 230 have not been granted. In some embodiments, at block 440, access request times 256 are increased by smart adaptable access request parameters. In some embodiments, after optimum access request generators 245 increase the access request times 256 by the smart adaptable access request parameters, the processes repeat at block 415 until access is granted by resource 230 at block 430.

In some embodiments, at block 455, when optimum access request generator 245 determines that access has been granted to processes 120 at block 430, optimum access request generators 245 make entries into resource grant status fields of entropic information 228 that access requests to resource 230 have been granted. In some embodiments, at block 460, optimum access request generators 245 update access granted counters 259 that indicate the number of times access has been granted for the process at the granted access request times 256.

In some embodiments, at block 462, optimum access request generators 245 determine whether access has been granted during initial access requests 241. In some embodiments, an access request 241 is an initial access request when the access request 241 occurred during a first access request iteration of the access request 241. In some embodiments, when optimum access request generators 245 determine that the access has been granted during initial access requests 241, block 462 proceeds to block 475 where the access request time 256 is designated at the optimum access request time 260.

In some embodiments, at block 465, optimum access request generators 245 generate access request entropies 257 for the granted access request times 256. In some embodiments, at block 470, optimum access request generators 245 determine whether the access request entropies 257 are equal to or below the optimum entropy access request thresholds 258.

In some embodiments, at block 450, when the access request entropies 257 are greater than the optimum entropy access request thresholds 258, optimum access request generators 245 set the granted access request times 256 as the access request times 256 for access requests 241 at block 415. In some embodiments, at block 475, when the access request entropies 257 are equal to or below the optimum entropy access request thresholds 258, optimum access request generators 245 designate the access request times 256 as the optimum access request time 260.

In some embodiments, at block 480, the optimum access request generators 245 position processes 120 in the optimum access request schedule 290. In some embodiments, at block 485, optimum access request generators 245 updates or locks the access request times 256 with the optimum access request time 260 such that the processes 120 associated with the optimum access request times 260 uses the optimum access request time 260 for subsequent access request iterations.

In some embodiments, with reference to FIG. 3A-FIG. 3H, because, for example, process 320-2 and process 320-3 were not granted access at the initial access request time 356-2 and the initial access request time 352-3 associated with the first access request iteration, process 320-2 and process 320-3 (e.g., the processes that were not granted access during the first request iteration 363-2-1 and the first request iteration 363-3-1) relinquish claim to the initial access request times associated with the first access request iteration (e.g., the first request iteration 363-2-1 and the first request iteration 363-3-1) by updating the access request time 356-2 and the access request time 356-3 by the smart adaptable access request parameter. In some embodiments, as a result of relinquishing access to the access request times associated with the first access request iteration, the access request time 356-1 of process 320-1 associated with first access request iteration is deemed the optimum access request time 360-1 for the process 320-1 that was granted access during the first access request iteration.

In some embodiments, with reference to FIG. 2A-FIG. 2G, after all the optimum access request times 260 for the processes 120 have been determined by the optimum access request generators 245, the optimum access request generators 245 may determine the optimum access request process positions 262 of the processes 120 by comparing times of the optimum access request times 270 to determine the optimum access request process position 262 of the optimum access request times 270 in chronological order. In some embodiments, by assessing the optimum access request times 270 in chronological order from minimum to maximum, the optimum access request generators 245 are configured to determine the optimum access request process positions 250 of each process 220 in the optimum access request schedule 290. In some embodiments, the optimum access request generators 245 store the optimum access request times 260 and the optimum access request process positions 262 in entropic information 228 and optimum access request schedule 290. In some embodiments, other processes 120 are configured to utilize the entropic information 228 and the optimum access request schedule 290 to further optimize their optimum access request times 260 by, for example, minimizing the optimum access request time 260 by analyzing the optimum access request times 260 of processes whose optimum access process position is prior to their optimum access process position in order to update the smart adaptable access request update parameter.

In some embodiments, a method includes requesting, via a process, access to a resource using an access request; determining, at the process, a resource grant status of the access request at an access request time; and positioning the process into an optimum execution schedule based upon a grant status assessment of the resource grant status of the process at the access request time.

In some embodiments of the method, as part of the grant status assessment, when the access request is granted by the resource, the process performs an entropic assessment of entropic information associated with the resource grant status of the process at the access request time.

In some embodiments of the method, the entropic assessment includes generating an access request entropy based upon an assessment of an access granted counter, the access granted counter representing a number of access requests that have been granted by the resource.

In some embodiments of the method, the access request entropy is generated by assigning an entropic value to the access request entropy that maps to a frequency of a plurality of access requests granted by the resource at the access request time.

In some embodiments of the method, when the access request entropy is below an optimum entropy access request threshold, the access request time associated with the access request entropy is designated as an optimum request time.

In some embodiments of the method, the process is positioned in the optimum execution schedule at the optimum request time.

In some embodiments of the method, after the access request time has been designated as the optimum request time, the process requests access to the resource using the optimum request time.

In some embodiments of the method, as part of the grant status assessment, when access to the resource is not granted, the access request time is increased by a smart adaptable access request update parameter.

In some embodiments of the method, the smart adaptable access request update parameter is adaptable based upon at least one parameter of entropic information.

In some embodiments of the method, wherein the at least one parameter is a duration an execution of a granted-access process that has been granted access to the resource.

In some embodiments of the method, after the access request time has been adjusted by the smart adaptable access request update parameter to generate an adjusted access request time, the process requests access to the resource using the adjusted access request time.

In some embodiments, a system includes a processor; and a non-transitory computer readable medium coupled to the processor, the non-transitory computer readable medium comprising code that: requests, via a process, access to a resource using an access request; determines, at the process, a resource grant status of the access request at an access request time; and positions the process into an optimum execution schedule based upon a grant-status assessment of the resource grant status.

In some embodiments of the system, when a result of the grant-status assessment is that the access request is granted, the process performs an entropic assessment of entropic information associated with the resource grant status of the process at the access request time.

In some embodiments of the system, the entropic assessment includes generating an access request entropy based upon an assessment of an access granted counter, the access granted counter representing a number of access requests that have been granted by the resource at the access request time.

In some embodiments of the system, the access request entropy is generated by assigning the access request entropy an entropic value that maps to a frequency of a plurality of access requests granted by the resource at the access request time.

In some embodiments of the system, when the access request entropy is below an optimum entropy access request threshold, the access request time associated with the access request entropy is designated as an optimum request time.

In some embodiments, a process-based scheduling system includes an optimum access request generator, the optimum access request generator being included in a process; and a process control block coupled to the optimum access request generator, wherein based upon an access grant assessment of access request grants received from a resource and requested at an access request time, the optimum access request generator is configured to generate an optimum access request time.

In some embodiments of the process-based scheduling system, the process control block is coupled to provide a frequency of access request grants at the access request time to the optimum access request generator.

In some embodiments of the process-based scheduling system, when the frequency of access request grants at the access request time for the process exceeds an access request grant threshold, the optimum access request generator generates the optimum access request time.

In some embodiments of the process-based scheduling system, the optimum access request time is indicative of an optimum access request process position of the process in an optimum execution schedule.

What is claimed is:

1. A method, comprising:
    requesting, via a process, access to a resource using an access request;
    determining, at the process, a resource grant status of the access request at an access request time; and
    positioning the process into an optimum execution schedule based upon a grant status assessment of the resource grant status of the process at the access request time, wherein an access request entropy is generated by assigning an entropic value to the access request entropy, the access request entropy being utilized as part of the grant status assessment to position the process.

2. The method of claim 1, wherein:
    as part of the grant status assessment, when the access request is granted by the resource, the process performs an entropic assessment of entropic information associated with the resource grant status of the process at the access request time.

3. The method of claim 2, wherein:
    the entropic assessment includes generating the access request entropy based upon an assessment of an access granted counter, the access granted counter representing a number of access requests that have been granted by the resource.

4. The method of claim 3, wherein:
    the entropic value maps to a frequency of a plurality of access requests granted by the resource at the access request time.

5. The method of claim 4, wherein:
    when the access request entropy is below an optimum entropy access request threshold, the access request time associated with the access request entropy is designated as an optimum request time.

6. The method of claim 5, wherein:
    the process is positioned in the optimum execution schedule at the optimum request time.

7. The method of claim 6, wherein:
    after the access request time has been designated as the optimum request time, the process requests access to the resource using the optimum request time.

8. The method of claim 2, wherein:
    as part of the grant status assessment, when access to the resource is not granted, the access request time is increased by a smart adaptable access request update parameter.

9. The method of claim 8, wherein:
    the smart adaptable access request update parameter is adaptable based upon at least one parameter of entropic information.

10. The method of claim 9, wherein:
    wherein the at least one parameter is a duration an execution of a granted-access process that has been granted access to the resource.

11. The method of claim 10, wherein:
    after the access request time has been adjusted by the smart adaptable access request update parameter to generate an adjusted access request time, the process requests access to the resource using the adjusted access request time.

12. A system, comprising:
    a processor; and
    a non-transitory computer readable medium coupled to the processor, the non-transitory computer readable medium comprising code that:
        requests, via a process, access to a resource using an access request;
        determines, at the process, a resource grant status of the access request at an access request time; and
        positions the process into an optimum execution schedule based upon a grant-status assessment of the resource grant status, wherein an access request entropy is generated by assigning an entropic value to the access request entropy, the access request entropy being utilized as part of the grant status assessment to position the process.

13. The system of claim 12, wherein:
    when a result of the grant-status assessment is that the access request is granted, the process performs an entropic assessment of entropic information associated with the resource grant status of the process at the access request time.

14. The system of claim 13, wherein:
    the entropic assessment includes generating the access request entropy based upon an assessment of an access granted counter, the access granted counter representing a number of access requests that have been granted by the resource at the access request time.

15. The system of claim 14, wherein:
    the entropic value maps to a frequency of a plurality of access requests granted by the resource at the access request time.

16. The system of claim 15, wherein:
    when the access request entropy is below an optimum entropy access request threshold, the access request time associated with the access request entropy is designated as an optimum request time.

* * * * *